April 21, 1959    J. E. PETRI ET AL    2,882,793
REAR VIEW MIRRORS
Filed Jan. 7, 1954    2 Sheets-Sheet 1
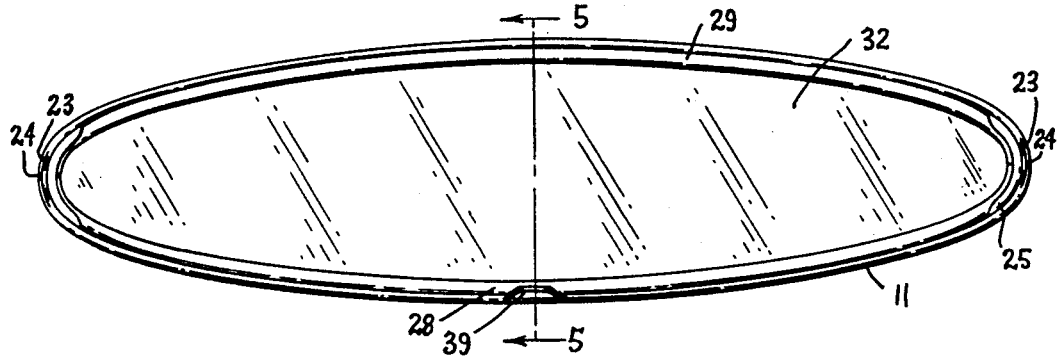
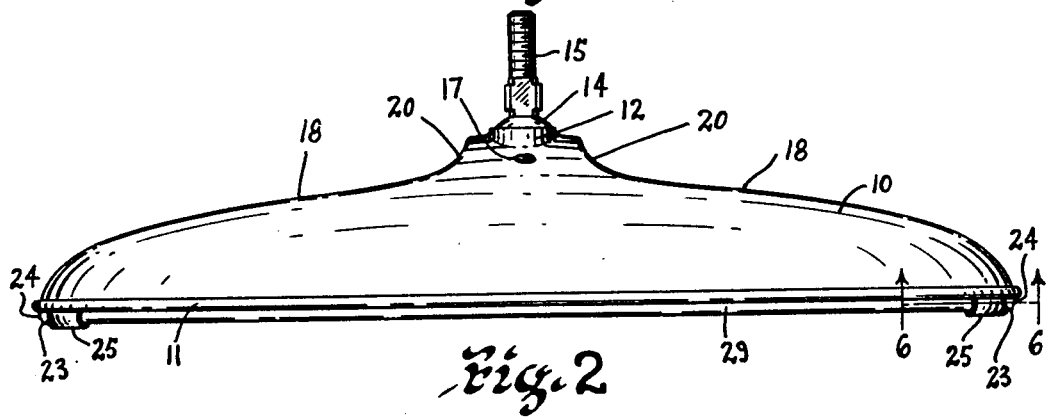
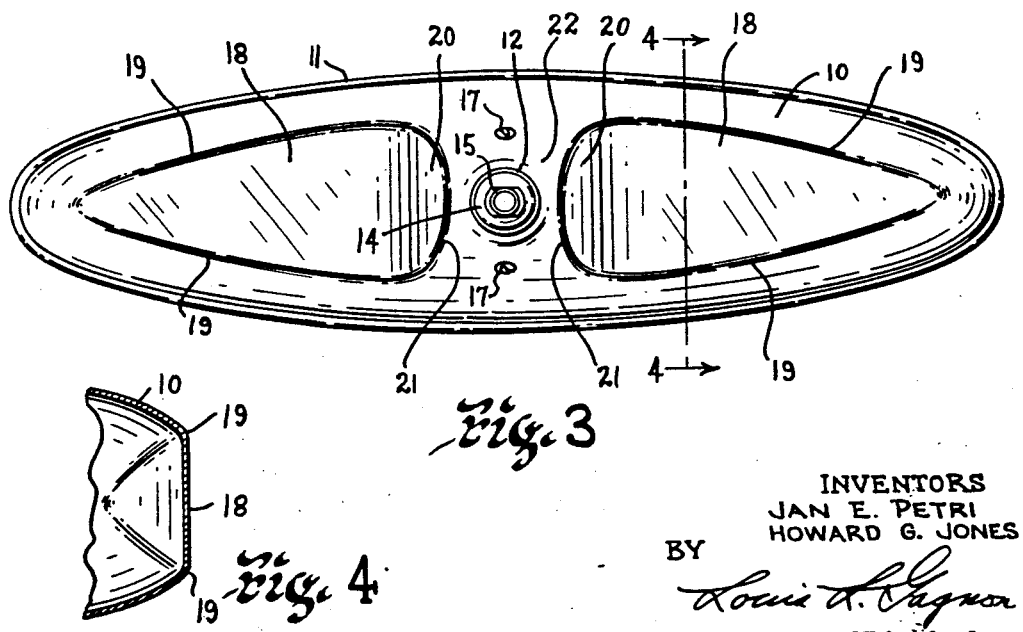
INVENTORS
JAN E. PETRI
HOWARD G. JONES
BY
Louis L. Gagnon
ATTORNEY April 21, 1959     J. E. PETRI ET AL     2,882,793
REAR VIEW MIRRORS
Filed Jan. 7, 1954     2 Sheets-Sheet 2
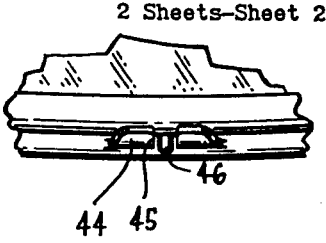
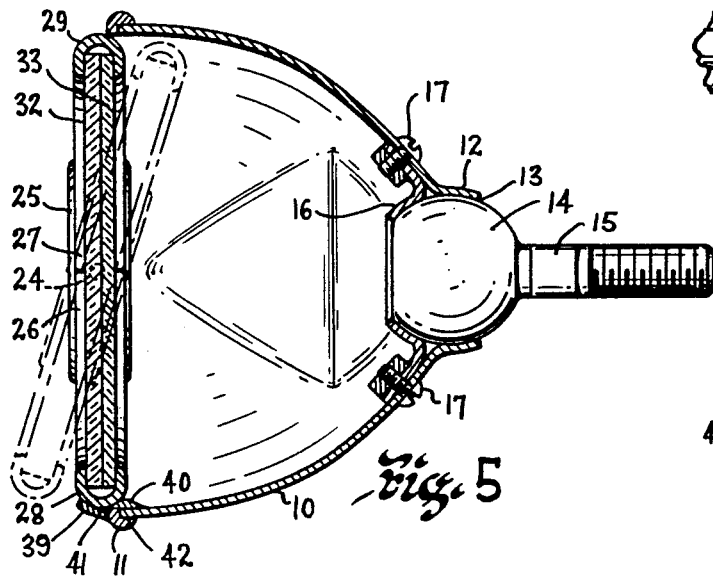
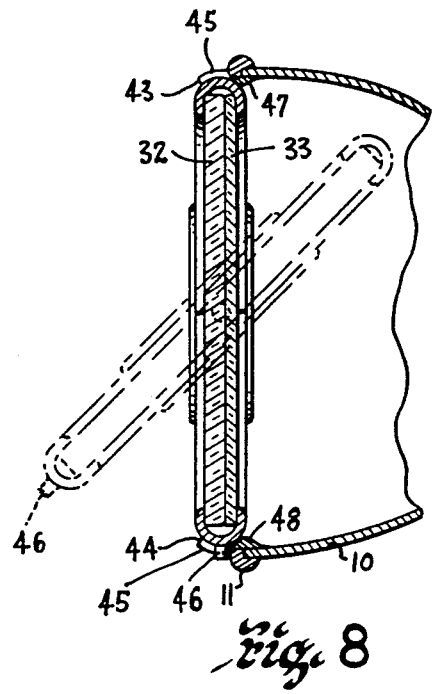
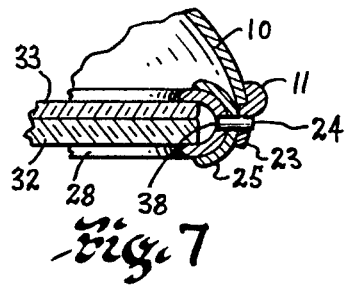
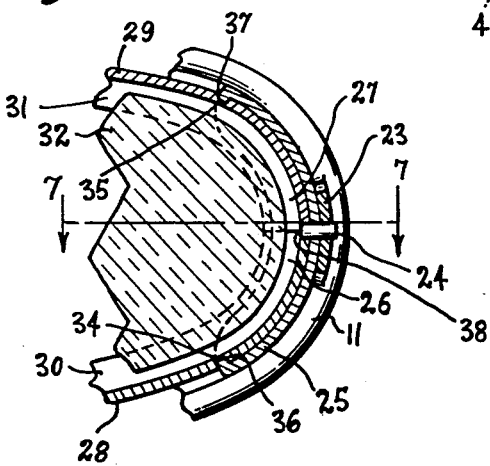
INVENTORS
JAN E. PETRI
HOWARD G. JONES
BY
*Louis L. Gagnon*
ATTORNEY

United States Patent Office 2,882,793
Patented Apr. 21, 1959

2,882,793

REAR VIEW MIRRORS

Jan E. Petri, Pomfret, Conn., and Howard G. Jones, Southbridge, Mass., assignors to American Optical Company, Southbridge, Mass., a voluntary association of Massachusetts Application January 7, 1954, Serial No. 402,744

10 Claims. (Cl. 88—77)

This invention relates to improvements in rear view mirrors and has particular reference to the provision of a novel mirror arrangement for daylight and night driving.

One of the principal objects of the invention is to provide a novel rear view mirror arrangement adapted particularly for use with motor vehicles and embodying a mirror designed primarily for daylight driving and having conventional high reflectivity and a mirror designed primarily for night driving and having controlled characteristics for reducing the intensity of glare illumination from vehicles approaching from the rear while increasing the contrast and the definition of the image viewed in said mirror.

Another object is to provide a rear view reversible mirror arrangement of the above character for vehicles wherein one or the other of said mirrors may be located in position of use by a simple and inexpensive manually operable flip-over arrangement and with the respective mirrors assuming substantially the same angle of reflection.

Another object is to provide a rear view mirror arrangement of the above character wherein the means for supporting said mirrors will be substantially vibration-free and, during the reversing of said mirrors, will function substantially automatically in locating and retaining said respective mirrors in substantially the same angle of reflection.

Another object is to provide a mirror arrangement of the above character wherein the mirrors are symmetrically similar on the opposed sides of the horizontal center line thereof and are pivoted along said center line to a similarly shaped forward edge of a housing which is so shaped as to provide clearance for rotary movement of said mirrors on said pivots and is further provided with means for automatically locating and retaining said mirrors in a desired plane of reflection.

Another object is to provide a hollow shell-type housing having portions thereof deformed in such a manner as to cause said housing to be resistant to flexing whereby a lightweight rigid support is provided for the mirrors.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. We, therefore, do not wish to be limited to the exact details of construction and arrangement of parts shown and described as the preferred forms only have been given by way of illustration.

Referring to the drawings:

Fig. 1 is a front elevational view of a device embodying the invention;

Fig. 2 is a top plan view of said device;

Fig. 3 is a rear elevational view of said device;

Fig. 4 is a fragmentary sectional view taken as on line 4—4 of Fig. 3 and looking in the direction indicated by the arrows;

Fig. 5 is an enlarged sectional view taken as on line 5—5 of Fig. 1 and looking in the direction indicated by the arrows;

Fig. 6 is an enlarged fragmentary sectional view taken as on line 6—6 of Fig. 2 and looking in the direction indicated by the arrows;

Fig. 7 is a sectional view taken as on line 7—7 of Fig. 6;

Fig. 8 is a fragmentary sectional view generally similar to Fig. 5 showing a modification of the invention; and Fig. 9 is a fragmentary face view of the lower portion of the structure illustrated in Fig. 8.

Referring more particularly to the drawings wherein like characters of reference designate like parts throughout the several views, the device embodying the invention comprises a hollow shell-like housing 10 having its open side formed elliptical in contour and provided with a beaded edge 11 for more positively retaining said edge to said oval shape. The housing cups rearwardly and inwardly from the edge 11 to a neck 12 having an opening 13 therein adapted to receive the ball head 14 of a connection bolt or the like 15. The inner surface of the neck 12 is shaped to have a relatively intimate fit with the contour of the ball head 14 and there is provided internally of the housing a clamp disc 16 provided with an inner surface shaped to the contour of said ball head 14. The clamp disc 16 is secured in frictional engagement with the ball head 14 by bolts or the like 17. The ball head 14 provides a universal support for the housing 10 whereby it may be adjusted to any desired angular position with respect to the longitudinal axis of the connection bolt 15. The neck 12 and clamp disc 16 are so dimensioned that proper tightening of the bolts 17 will cause them to have a desired frictional grip with the ball head 14.

In addition to providing the free edge of the housing 10 with a reinforcing bead 11, the said housing has flattened areas 18 pressed inwardly thereof to provide wall portions which are joined along relatively sharp bends 19 which extend in the longitudinal direction of the housing to further increase the rigidity of said housing. The flattened areas 18, in the vicinity of the neck 12, blend into transversely disposed cylindrically curved surfaces 20, which are joined along angled cylindrically curved surfaces 20, which are joined along angled edges 21 with a central outwardly curving cylindrical wall portion 22 on which the neck 12 is formed. The wall 22 has its axis disposed in the longitudinal direction of the housing and substantially normal to the axes of the cylindrically curved surfaces 20.

The opposed ends of the housing 10 are provided with perforated tongues 23 which extend slightly forwardly of the beaded edge 11, see Fig. 2, 5 and 6. The perforations of said tongues 23 are adapted to receive pivot posts 24 carried by end clamp members 25. The pivot posts 24 are secured to said clamp members 25 by welding, soldering, or the like. The said end clamp members 25 are shaped to fit over the meeting ends 26 and 27 of frame portions 28 and 29 having inner semi-circular shaped channels 30 and 31 adapted to receive the contour edges of a pair of superimposed mirrors 32 and 33. The shape of the frame portions 28 and 29, as well as the contour edges of the mirrors 32 and 33, are carefully controlled to be of substantially the same elliptical contour as the free beaded edge 11 of the housing 10 and are so dimensioned that the frame portions fit within said forward beaded edge when the pivot posts 24 are in pivoted relation with the forwardly extending perforated tongues 23.

The clamp members 25 are shaped to fit relatively intimately with the contour shape of the ends of the frame portions 28 and 29 and retain said meeting ends 26 and 27 in proper relation with each other, and also retain the frame portions 28 and 29 in proper fitted relation with the contour edges of the mirrors 32 and 33 through the provision of inwardly extending tongue portions 34 and 35 adjacent the opposed ends of said clamp members and which are adapted to be snapped within notches 36 and 37 formed at proper locations in the outer walls of said frame portions 28 and 29. The clamp members, therefore, function as caplike means having a relatively intimate overlying fit with the divided ends of the frame portions 28 and 29 and, in addition to retaining said ends in meeting relation with each other by snapping the tongue portions 34 and 35 within the notches 36 and 37, the said clamp members carry the pivot posts 24 by means of which the mirrors are pivotally supported so that they may be rotated about an axis extending along the horizontal center line of the mirrors.

The pivot posts 24, as shown in Figs. 5 and 6, extend inwardly of the clamp member 25 into semi-circular notches formed in the opposed ends of the frame portions 28 and 29, as illustrated at 38. One of the sides of the beaded edge 11, in this instance the lower side, as shown in Figs. 1 and 4, is provided with an outwardly and inwardly curving lip 39 and is further provided inwardly thereof with a raised portion 40 having a surface portion curved to meet with the inner surface curvature of the lip 39, as shown at 41, to clampingly receive the frame portions 28 and 29. The said frame portions are curved transversely, as shown in Fig. 4, and assume a relatively intimate fit with the inner surface curvature 41 of the cooperatively functioning lip 39 and raised portion 40. This provides means for substantially automatically clamping and positioning the respective mirrors 32 and 33 into desired plane of reflection.

It is particularly pointed out that when the supporting frames 28 and 29, carrying the mirrors 32 and 33, are rotated about the pivot posts 24 and the central areas 28 of the opposed sides of the frame is pressed into locking relation with the curved surface 41, said surfaces will alternately automatically locate the respective mirrors in substantially the same plane of reflection. The plane of reflection is that which is obtained by adjusting the housing 10 on the ball head 14 to the requirements of the observer, and when the mirrors are rotated for either daylight or night use this plane of reflection is not changed.

The cupping of the housing 10 is such as to provide ample clearance whereby the mirrors may be rotated and the providing of the angled edges 19 and 21, together with the beaded portion 11, is such as to provide a relatively rigid support for the mirrors when held in clamped position by the lip 39 and inwardly projecting portion 40, whereby the mirrors will not vibrate during the operation of the vehicle.

The beaded edge 11 may be formed separately of the housing 10, as shown in Fig. 4, and may be provided with an inner channel 42 which is adapted to fit with said free edge and be joined thereto by solder or the like.

The mirror 33 designed for night driving is of a bluish-gray tint having about a 3½% reflectivity and is preferably formed by placing a coating of bluish-gray paint on the rear of the glass plate which forms the mirror. The bluish-gray coating is such that while it greatly reduces the intensity of glare illumination it simultaneously increases contrast and definition of the image viewed in said mirror.

In Figs. 7 and 8 there is shown a slight modification wherein both of the upper and lower side walls of the housing 10 are provided with clamping lips 43 and 44, each having a central slot 45 therein adapted to receive a projection 46 extending outwardly of the contour edge of one side of the frame for the mirrors with the axis thereof lying substantially in the plane of the reflecting surfaces of said mirrors. The adjacent inner surfaces of the housing 10 are provided with inner projecting portions 47 and 48 which function cooperatively with the lips 43 and 44 to provide a seat to clamp and retain the mirrors in the proper plane of reflection as established by the pin 46 which is adapted to automatically limit the inward pivotal movement of the mirrors and aids in locating the proper plane of reflection of said mirrors. In this instance, when it is desired to rotate the mirrors the frame is pressed inwardly on the side thereof opposed to the projection 46 whereby the section of the frame having the projection thereon will swing outwardly away from one slotted lip. The frame is then rotated one-half turn and the side with the projection thereon is pressed into engagement with the other of said slotted lips. This will prevent accidental pressing of the mirror frame and mirrors inwardly beyond the desired relation thereof with said respective lips 43 and 44 and the correlated inwardly projecting portions 47 and 48.

It is pointed out that the inner surface shapes of the lips 43 and 44 and of the inwardly projecting portions 47 and 48 are controlled to have an intimate fit with the adjacent portion of the frame when the pin 46 is pressed inwardly of a respective slot 45 to a point where the said pin 46 engages the base of said slot. It is to be understood that the bases of the slots 45 are so controlled to function cooperatively with the pin 46 to cause the reflecting surfaces of the respective mirrors 32 and 33 to assume the same plane of reflection upon the completion of the rotation thereof.

The device is formed relatively simple in its construction and to be as light in weight as possible. The entire device may be quickly and easily assembled without the requirement of special tools or special equipment. All that is required is to place the reflecting surfaces of the mirrors 32 and 33 inwardly in adjacent relation with each other, press the frame sections 28 and 29 about the contour edges thereof and clamp the end members into locked relation with said frame portions. The pivot posts 24 may then be snapped inwardly of the perforated tongues 23 to position said pivot posts in proper pivotal relation with said tongues.

The bolt 15 functions in a conventional manner to secure the mirror in proper position in the vehicle. The desired frictional grip of the housing with the ball head 14 is obtained by proper tightening of the bolts 17.

In use all that is required is to flip the mirrors over and the said mirrors will automatically assume the plane of reflection which they were inherently adjusted to by moving the housing 10 on the ball head 14. The walls of the housing 10 have a resilient yielding action to permit the mirror frame to be snapped inwardly of the seats formed by the clamp lid 39 and inwardly projecting portion 40 or by the clamp lips 43 and 44 and the inwardly projecting portions 47 and 48 and will thereafter firmly hold the mirrors in adjusted position.

From the foregoing description, it will be seen that simple, efficient and economical means have been provided for accomplishing all of the objects and advantages of the invention.

Having described our invention, we claim:

1. A device of the character described comprising a hollow shell-like housing having a relatively long and narrow forward edge of a controlled contour shape, pivotal connections adjacent the opposed ends of said forward edge located in the direction of the longitudinal center line of said forward edge, a pair of mirrors positioned in back to back superimposed relation with each other and having a contour shape simulating the contour shape of said forward edge, a pair of channeled frame sections shaped to and fitted about the upper and lower contour edges of the mirrors and having attachment means adjacent the opposed ends thereof in interlocked relation with said frame sections for detachably retaining them on said mirrors, said attachment means having outwardly extending pivot posts located substantially along the horizontal center line of the mirrors and adapted to be pivotally connected with the pivotal connections on the housing whereby the mirrors may be rotated to reversed positions on said housing and means on said housing adapted to interlock with said frame sections for retaining said mirrors in a plane substantially parallel with the forward edge of said housing.

2. A device of the character described comprising a housing having a relatively thin forward edge of a controlled oval contour shape, a reinforcing rim on said edge, forwardly extending pivot means on said edge of the housing adjacent the laterally opposed ends thereof, mirror means of a shape simulating the shape of the forward edge of said housing, a pair of channelled frame sections on said mirror means shaped to and fitted about the contour edges of said mirror means with the ends thereof in meeting relation with each other, attachment means adjacent said ends of said frame sections in detachable interlocked relation therewith for retaining said frame sections in said fitted relation about said mirror means, said attachment means having pivot posts thereon pivotally engaging the pivot means carried by said housing whereby said mirror means is located slightly forwardly of the forward edge of said housing and may be revolved about said pivot means past said forward edge to reversed positions to selectively position one side or the other of said mirror means in a plane substantially parallel with the plane of the forward edge of the housing and means in the form of a forwardly extending lip carried by a portion of said forward edge of the housing and shaped to receive and frictionally engage said frame sections to retain said mirror means substantially in the plane of said forward edge of the housing.

3. A device of the character described comprising a hollow shell-like housing having a relatively long and narrow forward edge of a controlled contour shape, pivotal connections adjacent the opposed ends of said forward edge located on a line forwardly of and in the direction of the longitudinal center line of said forward edge, mirror means having a contour shape simulating the contour shape of said forward edge, a pair of channeled frame sections shaped to and fitted about the upper and lower contour edges of the mirror means and having attachment means adjacent the opposed ends thereof in interlocked relation with said frame sections for detachably retaining them on said mirrors, said attachment means each having pivot means thereon and located substantially along the horizontal center line of the mirrors and adapted to be pivotally connected with the pivotal connections on the housing whereby the mirrors may be rotated to reversed positions on said housing and means on said housing adapted to interlock with said frame sections for retaining said mirrors in a plane substantially parallel with the forward edge of said housing.

4. A device of the character described comprising a hollow shell-like housing having a forward edge of a relatively long and narrow elliptical shape, said housing being cupped rearwardly from said forward edge to a relatively narrow neck portion having a curved seat therein, attachment means having a ball-shaped end for engagement in said seat, means within said housing for retaining said ball-shaped end in frictional contact with said seat, mirror means of substantially the same elliptical shape as the elliptical shape of the forward edge of the housing, frame sections shaped to and fitted about the contour edges of the mirrors and each having a notch adjacent the opposed free end portions thereof, attachment means shaped to fit the ends of said frame sections, said attachment means being adapted to straddle the free ends of said frame sections and having inwardly projecting portions adjacent the opposed ends thereof adapted to be fitted in latched relation with said notches to retain said frame sections in fitted relation with the mirror means, means for pivotally connecting said attachment means to said forward edge of the housing adjacent the opposed sides of said housing and along the horizontal center line of said housing whereby said mirror means may be revolved with respect to said forward edge, and means carried by said forward edge at a location intermediate said means for pivotally connecting the mirror means to said housing for frictionally and releasably engaging said frame sections at a given location of adjustment for retaining said mirror means in desired angular relation with respect to said forward edge of the housing.

5. A device of the character described comprising a relatively long and narrow housing having a hollow interior and a forward edge of a controlled contour shape, perforated pivot means at each end of said housing fixed to the forward edge thereof, the perforations in said pivot means lying on a common axis disposed in the direction of the longitudinal center line of said forward edge, mirror means having a contour shape simulating the contour shape of said forward edge, means at each end of said mirror means for directly pivotally connecting said mirror means along the longitudinal center line thereof to said perforated pivot means carried by the housing, the hollow interior of said housing being of a size and shape such as to permit said mirror means to be reversibly adjusted by being rotated about the common axis of the perforations in said perforated pivot means, friction means on the upper and lower edge portions of the housing protruding forwardly of said edge portions with which the mirror means is adapted to engage to retain said mirror means in given fixed positions of adjustment when pivoted on said perforated pivot means, said friction means each having a slot therein and a pin on one edge of said mirror means for alternate engagement in said slots depending upon the direction of adjustment of said mirror means.

6. A device of the character described comprising a support, pivot means on said support adjacent opposed ends thereof, mirror means of a dimension controlled to fit said support, upper and lower frame sections on said mirror means shaped to and fitted about the respective contour edges of said mirror means, said upper and lower frame sections having their exposed ends adjacent the opposed ends of the mirror means, and attachment means shaped to fit with and overlie the adjacent opposed ends of said frame sections in detachable interlocked relation therewith for retaining said frame sections on said mirror means, said attachment means having pivot means thereon adapted to pivotally engage the pivot means carried by said support whereby said mirror means may be revolved about said pivot means to expose one or the other of the sides of said mirror means, and means carried by said support adapted to frictionally engage with said frame sections to retain said mirror means in desired position of adjustment.

7. A device of the character described comprising a support, mirror means of a size controlled to be connected with said support, frame sections shaped to and fitted about the contour edges of the mirror means and each having a notch adjacent the opposed free end portions thereof, attachment means shaped to fit said free end portions, said attachment means being adapted to straddle said end portions in fitted relation therewith and having inwardly projecting portions adjacent the opposed ends thereof for assuming a latched relation with said notches to retain said frame sections in fitted relation with the mirror means and means for connecting said mirrors with said support.

8. A device of the character described comprising a support, mirror means shaped to be assembled with said support, frame sections shaped to and fitted about the contour edges of the mirror means and each having a notch adjacent the opposed free end portions thereof, attachment means shaped to fit said end portions, said attachment means being adapted to straddle said free end portions in fitted relation therewith and having inwardly projecting portions adjacent the opposed ends thereof for assuming a latched relation with said notches to retain said frame sections in fitted relation with the mirror means, means for pivotally connecting said attachment means to said support whereby said mirror means may be revolved with respect to said support, and means carried by said support for frictionally and releasably engaging said frame sections at a given location of adjustment for retaining said mirror means in desired angular relation with respect to said support.

9. A device of the character described comprising a relatively long and narrow cup-shaped housing having a forward edge of a controlled contour shape, pivot means fixed to said housing adjacent the forward edge thereof and located at each of the opposite ends of said housing with their axes disposed in the direction of the longitudinal center line of said forward edge of the housing, mirror means of a contour shape simulating the contour shape of said forward edge and having its opposed sides of given reflective qualities, means for pivotally connecting the ends of said mirror means directly to said pivot means on said housing, the interior of said housing being of a predetermined depth and shape such as to allow said mirror means to be revolved at least 180° about the axes of said pivot means, friction latch means on said forward edge of the housing permitting said mirror means to be revolved through an arc of at least 180° about the axes of said pivot means and for yieldingly engaging and retaining said mirror means in given fixed positions of adjustment with the plane of a selected one of said sides thereof facing outwardly of and positioned substantially parallel to the general plane of said forward edge of the housing, said friction latch means embodying at least one resilient clamping lip carried by the forward edge of said housing and located to catch the edge of said mirror means when it is pivoted to said given positions of adjustment, the edge of said lip being slotted to a predetermined depth and one side of the edge of said mirror means being provided with an outwardly extending locating pin for engagement in said slot whereby said locating pin when fully entered in the slotted portion of said lip will positively locate the plane of the mirror means substantially parallel to the plane of the forward edge of said housing.

10. A device of the character described comprising a hollow support having a forwardly disposed open end, a pair of mirrors positioned in back to back superimposed relation with each other and having a contour of a size and shape to properly fit with the edge portion of said open end of the support, said support having spaced pivot means adjacent its forwardly disposed edge portion and located at opposite ends thereof, a frame structure encircling the periphery of said mirrors, said frame structure having pivot means on the opposed ends thereof adapted to be directly pivotally interconnected with the pivot means of the support, the axes of the interconnected pivot means lying substantially along the horizontal center line of the mirrors, the hollow interior of said support being so shaped as to permit said mirrors to be rotated at least 180° about the axes of the pivot means on said support to reverse the positions of the mirrors while retaining their proper fitted relation with the support, one of said mirrors having a conventional high reflectivity and the other of said mirrors having a bluish-gray tint and relatively low reflectivity and being such as to increase the contrast and definition of an image viewed in said mirror together with at least one resilient lip extending outwardly of the edge portion of the open end of said support to receive and resiliently grip a respective side edge portion of said frame structure when the plane of the mirrors is substantially parallel with the plane of said open end of the support whereby either mirror may be rotated to face outwardly of said support and be positively located in desired position of use.

References Cited in the file of this patent

UNITED STATES PATENTS

| | | |
|---|---|---|
| 1,875,554 | Bell | Sept. 6, 1932 |
| 2,052,770 | Hofer | Sept. 1, 1936 |
| 2,307,532 | Murphy | Jan. 5, 1943 |
| 2,357,720 | Quintile | Sept. 5, 1944 |
| 2,442,504 | Miller | June 1, 1948 |
| 2,502,699 | Budreck | Apr. 4, 1950 |
| 2,797,620 | Weinrich | July 2, 1957 |

FOREIGN PATENTS

| | | |
|---|---|---|
| 1,045,935 | France | July 1, 1953 |